United States Patent
Lee et al.

(10) Patent No.: US 11,483,765 B2
(45) Date of Patent: Oct. 25, 2022

(54) METHOD AND APPARATUS FOR SELECTING NETWORK SLICES IN WIRELESS COMMUNICATION SYSTEM

(71) Applicant: Samsung Electronics Co., Ltd., Suwon-si (KR)

(72) Inventors: Hoyeon Lee, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/090,728

(22) Filed: Nov. 5, 2020

(65) Prior Publication Data

US 2021/0136675 A1    May 6, 2021

(30) Foreign Application Priority Data

Nov. 6, 2019  (KR) .................. 10-2019-0141234
Mar. 31, 2020 (KR) .................. 10-2020-0039439
Apr. 6, 2020  (KR) .................. 10-2020-0041685

(51) Int. Cl.
| | |
|---|---|
| *H04W 48/18* | (2009.01) |
| *H04W 76/27* | (2018.01) |
| *H04W 8/08* | (2009.01) |
| *H04W 36/00* | (2009.01) |
| *H04W 36/08* | (2009.01) |
| *H04W 48/16* | (2009.01) |
| *H04W 48/20* | (2009.01) |
| *H04W 60/00* | (2009.01) |

(52) U.S. Cl.
CPC ............ *H04W 48/18* (2013.01); *H04W 8/08* (2013.01); *H04W 36/0072* (2013.01); *H04W 36/08* (2013.01); *H04W 48/16* (2013.01); *H04W 48/20* (2013.01); *H04W 60/00* (2013.01); *H04W 76/27* (2018.02)

(58) Field of Classification Search
CPC ..... H04W 48/16; H04W 48/18; H04W 48/20; H04W 76/27; H04W 8/08; H04W 36/0072; H04W 36/08; H04W 60/00
See application file for complete search history.

(56) References Cited

U.S. PATENT DOCUMENTS

2018/0192445 A1    7/2018  Jiang
2018/0368061 A1*  12/2018  Yu ......................... H04W 8/02
(Continued)

FOREIGN PATENT DOCUMENTS

| WO | 2018/034924 A1 | 2/2018 |
| WO | 2018/083664 A1 | 5/2018 |

OTHER PUBLICATIONS

European Search Report dated Jul. 30, 2021 in connection with European Patent Application No. EP 20 20 6089, 16 pages.

(Continued)

*Primary Examiner* — Wayne H Cai

(57) ABSTRACT

A method, performed by a user equipment (UE), of selecting a network slice includes: receiving information about at least one network slice and information about frequency operating bands that are allowed for the at least one network slice; selecting a base station (BS) to be accessed, based on the received information about the at least one network slice and the information about the frequency operating bands that are allowed for the at least one network slice; and performing a registration procedure on the selected BS.

20 Claims, 9 Drawing Sheets

(56) References Cited

U.S. PATENT DOCUMENTS

| | | | |
|---|---|---|---|
| 2019/0098537 A1 | 3/2019 | Qiao et al. | |
| 2020/0252862 A1* | 8/2020 | Kim | H04W 60/00 |
| 2021/0037455 A1* | 2/2021 | Zhu | H04W 48/16 |

OTHER PUBLICATIONS

3rd Generation Partnership Project, Technical Specification Group Services and System Aspects, "System Architecture for the 5G System (5GS)", 3GPP TS 23.501, V16.2.0, Stage 2 (Release 16), Sep. 2019, 389 pages.

International Search Report and Written Opinion of the International Searching Authority in connection with International Application No. PCT/KR2020/015430 dated Feb. 18, 2021, 11 pages.

Partial European Search Report dated Apr. 1, 2021 in connection with European Patent Application No. 20206089.3, 8 pages.

Xiaomi (Rapporteur), "Report of email discussion: [97bis#14][NR] Slicing", 3GPP TSG-RAN2 #99, R2-1709158 Resubmitted R2-1706871, Berlin, Germany, Aug. 21-25, 2017, 37 pages.

Huawei, "Allowed NSSAI", 3GPP TSG-RAN3 Meeting #99, R3-181098, Athens, Greece, Feb. 26-Mar. 2, 2018, 4 pages.

* cited by examiner

METHOD AND APPARATUS FOR SELECTING NETWORK SLICES IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2019-0141234, filed on Nov. 6, 2019, 10-2020-0039439, filed on Mar. 31, 2020, and 10-2020-0041685, filed on Apr. 6, 2020 in the Korean Intellectual Property Office, the disclosures of which are incorporated by reference herein in their entireties.

BACKGROUND

1. Field

The disclosure relates to a technology for selecting network slices in a wireless communication system.

2. Description of Related Art

In order to meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

Because various services can be provided due to the aforementioned development of mobile communication systems, there is a demand for a method of efficiently selecting network slices.

SUMMARY

According to an embodiment of the disclosure, provided are a method and apparatus for effectively providing a service in a wireless communication system.

Additional aspects will be set forth in part in the description which follows and, in part, will be apparent from the description, or may be learned by practice of the presented embodiments of the disclosure.

According to an embodiment of the disclosure, a method, performed by a user equipment (UE), of selecting a network slice includes: receiving information about at least one network slice and information about frequency operating bands that are allowed for the at least one network slice; selecting a base station (BS) to be accessed, based on the received information about the at least one network slice and the information about the frequency operating bands that are allowed for the at least one network slice; and performing a registration procedure on the selected BS.

The received information about the at least one network slice and the information about the frequency operating bands that are allowed for the at least one network slice may be included in at least one of a System Information Block (SIB), a Radio Resource Control (RRC) message, a Registration Accept message, a Registration Reject message, or a UE configuration Update command.

The information about the frequency operating bands that are allowed for the at least one network slice may be stored in an Access and Mobility Management Function (AMF) or a Network Slice Selection Function (NSSF).

The information about the frequency operating bands that are allowed for the at least one network slice stored in the AMF or the NSSF may be configured by operations, administration and maintenance (OAM).

The method may further include: transmitting, to the BS, a Registration request message including at least one of information about a cell or information about a BS, to which the UE can access, and information about a network slice requested by the UE; receiving a message including information indicating whether performing a cell reselection procedure is requested, the information being generated based on information about whether the network slice requested by the UE is allowed, which is determined by the AMF; and performing a cell reselection procedure, based on the message including the information indicating whether performing the cell reselection procedure is requested.

The performing of the cell reselection procedure may include performing the cell reselection procedure when the message including the information indicating whether performing the cell reselection procedure is requested includes an empty Tracking Area Identifier (TAI) or an empty Routing Area (RA) or includes information indicating that a registration procedure is requested.

When the message including the information indicating whether performing the cell reselection procedure is requested includes frequency information, the performing of the cell reselection procedure may include performing the cell reselection procedure based on the frequency information.

According to another embodiment of the disclosure, a method, performed by an Access and Mobility Management Function (AMF), of selecting a network slice includes: receiving, from a base station (BS), a Registration request message including at least one of information about a cell or information about the BS, to which a user equipment (UE) can access, and information about a network slice requested by the UE; deciding whether to allow the network slice requested by the UE, based on the information included in the Registration request message; and determining whether performing the cell reselection procedure is requested, based on a result of the deciding.

The method may further include transmitting a Non-Access Stratum (NAS) message to the BS, the NAS message may include information about a network slice allowed for the UE and frequency information, and the frequency information may include Radio Access Technology (RAT) Frequency Selection Priority (RFSP) index information.

The method may further include transmitting, to the BS, a message indicating that a cell reselection procedure is requested, based on a result of the determining, and the UE may be provided identifier information of a target BS via the message indicating that the cell reselection procedure is requested.

According to another embodiment of the disclosure, a user equipment (UE) for selecting a network slice includes: a transceiver; and a processor combined with the transceiver and configured to receive information about at least one network slice and information about frequency operating bands that are allowed for the at least one network slice, select a base station (BS) to be accessed, based on the received information about the at least one network slice and the information about the frequency operating bands that are allowed for the at least one network slice, and perform a registration procedure on the selected BS.

The received information about the at least one network slice and the information about the frequency operating bands that are allowed for the at least one network slice may be included in at least one of a System Information Block (SIB), a Radio Resource Control (RRC) message, a Registration Accept message, a Registration Reject message, or a UE configuration Update command.

The information about the frequency operating bands that are allowed for the at least one network slice may be stored in an Access and Mobility Management Function (AMF) or a Network Slice Selection Function (NSSF).

The information about the frequency operating bands that are allowed for the at least one network slice stored in the AMF or the NSSF may be configured by operations, administration and maintenance (OAM).

The processor may be further configured to transmit, to the BS, a Registration request message including at least one of information about a cell or information about a BS, to which the UE can access, and information about a network slice requested by the UE, receive a message including information indicating whether performing a cell reselection procedure is requested, the information being generated based on information about whether the network slice requested by the UE is allowed, which is determined by the AMF, and perform a cell reselection procedure, based on the message including the information indicating whether performing the cell reselection procedure is requested.

The processor may be further configured to perform the cell reselection procedure when the message including the information indicating whether performing the cell reselection procedure is requested includes an empty Tracking Area Identifier (TAI) or an empty Routing Area (RA) or includes information indicating that a registration procedure is requested.

When the message including the information indicating whether performing the cell reselection procedure is requested includes frequency information, the processor may be further configured to perform the cell reselection procedure based on the frequency information.

According to an embodiment of the disclosure, an Access and Mobility Management Function (AMF) for selecting a network slice includes a transceiver; and a processor combined with the transceiver and configured to receive, from a base station (BS), a Registration request message including at least one of information about a cell or information about the BS, to which a user equipment (UE) can access, and information about a network slice requested by the UE, decide whether to allow the network slice requested by the UE, based on the information included in the Registration request message, and determine whether performing a cell reselection procedure is requested, based on a result of the deciding.

The processor may be further configured to transmit a Non-Access Stratum (NAS) message to the BS, the NAS message may include information about a network slice allowed for the UE and frequency information, and the frequency information may include Radio Access Technology (RAT) Frequency Selection Priority (RFSP) index information.

The processor may be further configured to transmit, to the BS, a message indicating that a cell reselection procedure is requested, based on a result of the determining, and the UE may be provided identifier information of a target BS via the message indicating that the cell reselection procedure is requested.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
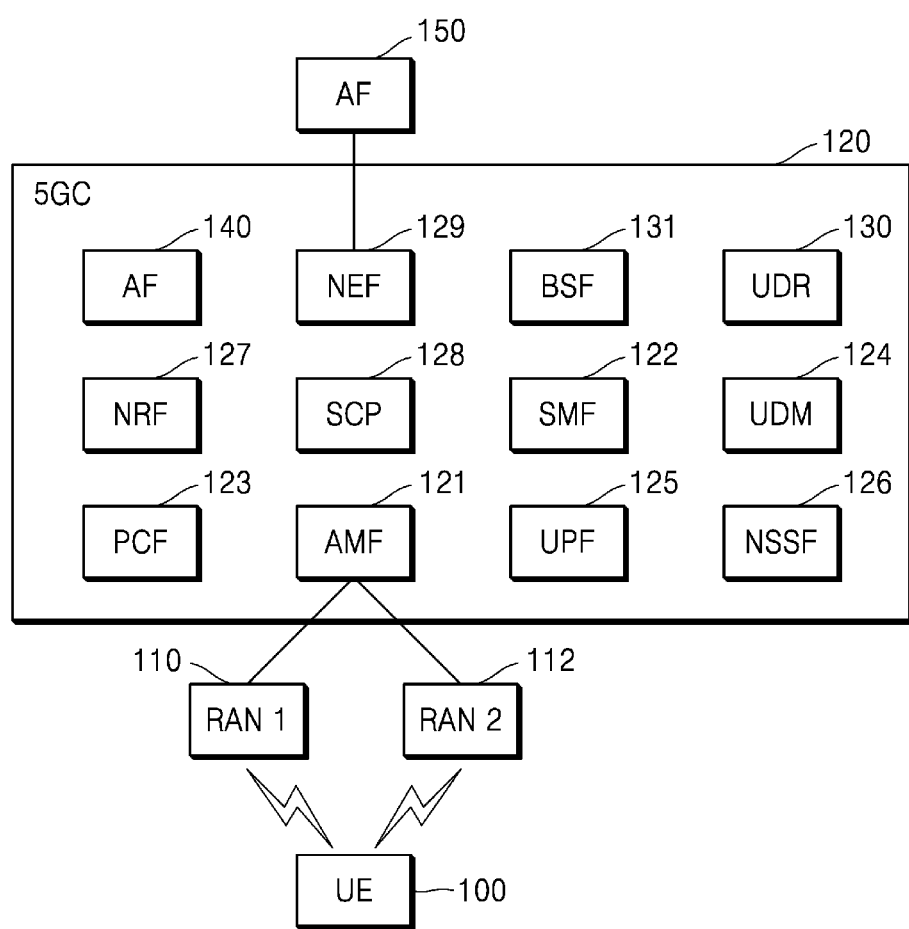
FIG. 1 illustrates a $5^{th}$ generation (5G) system, according to an embodiment of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operational principles of the disclosure will be described in detail with reference to accompanying drawings. In the following descriptions of the disclosure, well-known functions or configurations are not described in detail because they would obscure the disclosure with unnecessary details. For the same reasons, in the drawings, some elements may be exaggerated, omitted, or roughly illustrated. Also, the size of each element does not exactly correspond to an actual size of each element. In the drawings, the same or corresponding elements are denoted by the same reference numerals.

The terms used in the specification are defined in consideration of functions used in the disclosure, and may be changed according to the intent or known methods of operators and users. Accordingly, definitions of the terms should be understood based on the entire description of the present specification.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments of the disclosure are provided so that this disclosure will be thorough and complete, and will fully convey the scope of the disclosure only defined by the claims to one of ordinary skill in the art. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed by the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit", as used in the present embodiment of the disclosure refers to a software or hardware component, such as field-programmable gate array (FPGA) or application-specific integrated circuit (ASIC), which performs certain tasks. However, the term "~ unit" does not mean to be limited to software or hardware. A unit may be configured to be in an addressable storage medium or configured to operate one or more processors. Thus, a unit may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. Further, the components and units may be implemented to operate one or more central processing units (CPUs) in a device or a secure multimedia card.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Hereinafter, a base station is an entity that allocates resources to a terminal, and may be at least one of a Node B, a base station (BS), an eNode B (eNB), a gNode B (gNB), a radio access unit, a BS controller, or a node on a network. Examples of the terminal may include a UE, a mobile station (MS), a cellular phone, a smartphone, a computer, a multimedia system capable of performing a communication function, or the like. Furthermore, embodiments of the disclosure may also be applied to other communication systems having similar technical backgrounds or channel types. Furthermore, embodiments of the disclosure are applicable to other communication systems through modification at the discretion of one of ordinary skill in the art without greatly departing from the scope of the disclosure.

Hereinafter, terms identifying an access node, terms indicating network entities or network functions (NFs), terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

For convenience of descriptions, the disclosure uses terms and names defined in the 3$^{rd}$ Generation Partnership Project (3GPP) long term evolution (LTE) and 5$^{th}$ generation (5G) standards. However, the disclosure is not limited to these terms and names, and may be equally applied to communication systems conforming to other standards.

FIG. 1 illustrates a 5G system, according to an embodiment of the disclosure.

Referring to FIG. 1, the 5G system according to an embodiment of the disclosure may consist of a UE 100, a BS including a Radio Access Network (RAN) 1 110 and a RAN 2 112, and a 5G core network 120 (hereinafter interchangeably used with the 5GC or the 5G Core Network). The 5G core network 120 may consist of network functions (hereinafter interchangeably used with the NFs) including an Access and Mobility Management Function (AMF) 121, a Session Management Function (SMF) 122, a Policy Control Function (PCF) 123, Unified Data Management (UDM) 124, a User Plane Function (UPF) 125, a Network Slice Selection Function (NSSF) 126, a Network Repository Function (NRF) 127, a Service Communication Proxy (SCP) 128, a Network Exposure Function (NEF) 129, a Unified Data Repository (UDR) 130, a Binding Support Function (BSF) 131, and the like. According to an embodiment of the disclosure, the NF may refer to a network entity (hereinafter interchangeably used with the NE) or a network resource. The BS may include a Next Generation-Radio Access Network (NG-RAN) (hereinafter interchangeably used with the 5G-RAN or the RAN), Evolved Universal Terrestrial Radio Access Network (E-UTRAN), and the like. The UE 100 (also referred to as the terminal 100) may access the 5G core network 120 through the RAN 1 110.

According to an embodiment of the disclosure, the AMF 121 may refer to an NF configured to manage access of the UE 100 to a wireless network and mobility of the UE 100.

According to an embodiment of the disclosure, the SMF 122 may refer to an NF configured to manage packet data network connection to be provided to the UE 100. The packet data network connection may be called a Protocol Data Unit (PDU) session. PDU session information may include Quality of Service (QoS) information, charging information, packet processing information, or the like.

According to an embodiment of the disclosure, the PCF 123 may refer to an NF configured to apply, to the UE 100, a service policy, a charging policy, and a PDU session policy of a mobile network operator.

According to an embodiment of the disclosure, the UPF 125 may function as a gateway that transfers packets transmitted from or received by the UE 100 and may refer to an NF controlled by the SMF 122.

The UPF 125 may be connected to a Data Network (DN) and thus may transfer an uplink data packet generated by the UE 100 to the DN through the 5G system. Also, the UPF 125 may transfer a downlink data packet generated by the DN to the UE 100 through the 5G system. For example, the UPF 125 may be connected to the DN connected to the Internet and thus may route a data packet transmitted from the UE 100 to the Internet or may route a data packet transmitted from the Internet to the UE 100.

According to an embodiment of the disclosure, the UDM 124 may refer to an NF configured to store and manage information about subscribers.

According to an embodiment of the disclosure, the NEF 129 refers to a NF capable of accessing UE management information in the 5G core network 120, and may be connected to the NFs in the 5G core network 120 and thus may transmit UE-related information to the NFs or report the UE-related information to the outside by subscribing a mobility management event of the UE 100, subscribing a session management event of the UE 100, requesting session-related information, configuring charging information to the UE 100, or requesting a change in a PDU session policy with respect to the UE 100.

According to an embodiment of the disclosure, the UDR 130 may refer to an NF configured to store and manage data. For example, the UDR 130 may store UE subscription information and may provide the UE subscription information to the UDM 124. The UDR 130 may store operator policy information and may provide operator policy information the PCF 123. The UDR 130 may store network service exposure information and may provide the network service exposure information to the NEF 129.

According to an embodiment of the disclosure, the NSSF 126 may refer to an NF configured to determine a network slice usable by the UE 100 and to determine network slice instances constituting the network slice.

Each of the NFs defines its service to provide, and services provided by the NFs may each be referred to as an Npcf service, an Nsmf service, a Namf service, a Nnef service, or the like. For example, when the AMF 121 transmits a session-related message to the SMF 122, the AMF 121 may use a service (or an Application Programming Interface (API)) named Nsmf_PDUSession_CreateSMContext.

According to an embodiment of the disclosure, an application function (AF) 140 or 150 may refer to an NF capable of using services and functions provided by the 5G core network 120. Also, an AF may refer to an application server. In more detail, the AF 150 may communicate with the NFs constituting the 5G core network 120 through the NEF 129, or the AF 140 may directly communicate with the NFs constituting the 5G core network 120 without using the NEF 129. Furthermore, the AF 140 or 150 may be positioned in the 5G core network 120, or may be positioned in an external network (e.g., a network of a third service provider).

According to an embodiment of the disclosure, the UE 100 may access the AMF 121 through the RAN 1 110 and may transmit or receive signaling messages to or from a control plane of the 5G core network 120. Also, the UE 100 may access the UPF 125 through the RAN 1 110 and may transmit or receive user plane data to or from the DN. An application server providing an application layer service to the UE 100 may be referred to as the AF when the application server transmits or receives control plane signaling messages to or from the 5G core network 120, and may be referred to as the DN when the application server transmits or receives user plane data to or from the UE 100. Also, the AF or the DN may be interchangeably used to name the application server.

A mobile communication system (a wireless communication system) may be configured as a network that supports network slicing. That is, in the mobile communication system, one physical network may consist of logically-divided network slices (hereafter, also referred to as the slices) and may be managed. For various services with different characteristics, the mobile network operator may provide the network slices that are respectively dedicated to the services. The network slices may differently require a type and amount of resources necessary for characteristics of the services, and the mobile communication system may guarantee resources requested by each network slice. For example, a network slice providing a voice call service may have high occurrences of control plane signaling, and may consist of NFs specialized therefor. A network slice providing an internet data service may have high occurrences of large-volume data traffic and may consist of NFs specialized therefor.

According to an embodiment of the disclosure, in the 5G system defined in the 3GPP, a single network slice may be referred to as Single-Network Slice Selection Assistance Information (S-NSSAI). The S-NSSAI may consist of a value of a Slice/Service Type (SST) value and a value of a Slice Differentiator (SD). The SST may indicate a characteristic of a service (e.g., enhanced Mobile BroadBand (eMBB), Internet of things (IoT), Ultra-Reliable and Low-Latency Communications (URLLC), vehicle-to-everything (V2X), etc.) supported by a slice. The value of the SD may refer to a value to be used as an additional identifier with respect to a particular service indicated by the SST.

NSSAI may include one or more S-NSSAIs. Examples of the NSSAI may include, but are not limited to, Configured NSSAI stored in a UE, Requested NSSAI requested by a UE, Allowed NSSAI allowed for usage by a UE that is determined by an NF (e.g., an AMF, an NSSF, etc.) of a 5G core network, and subscribed NSSAI to which a UE subscribes.

An AMF according to an embodiment of the disclosure may be connected to one or more RANs. Referring to FIG. 1, the AMF 121 may be connected to the RAN 1 110 and the RAN 2 112. The AMF and the RAN according to an embodiment of the disclosure may serve (also referred to as "support") one or more S-NSSAIs. When describing embodiments of the disclosure, it may be assumed that the AMF 121 supports S-NSSAI A, S-NSSAI B, and S-NSSAI C. Also, it may be assumed that the RAN 1 110 supports S-NSSAI A. Also, it may be assumed that the RAN 2 112 supports S-NSSAI A and S-NSSAI B.

The RAN 1 110 and the RAN 2 112 according to an embodiment of the disclosure may support a same Radio Access Technology (RAT) type. For example, the RAN 1 110 and the RAN 2 112 may support the New Radio (NR). Alternatively, the RAN 1 110 and the RAN 2 112 may support the E-UTRA.

The RAN 1 110 and the RAN 2 112 according to an embodiment of the disclosure may support different RAT types. For example, the RAN 1 110 may support the NR, and the RAN 2 112 may support the E-UTRA. Alternatively, the RAN 1 110 may support the E-UTRA, and the RAN 2 112 may support the NR.

The RAN 1 110 and the RAN 2 112 according to an embodiment of the disclosure may support one or more RAT types. For example, the RAN 1 110 or the RAN 2 112 may support the NR and the E-UTRA.

The RAN 1 110 and the RAN 2 112 according to an embodiment of the disclosure may support one or more frequency bands. Table 1, Table 2, or Table 3 shows an example of frequency bands supportable by the RAN 1 110 and the RAN 2 112.

Table 1 illustrates examples of operating bands, indicated in mega-Hertz (MHZ) for low and high uplink frequencies ($F_{UL\_low}$, $F_{UL\_high}$) and low and high downlink frequencies ($F_{DL\_low}$, $F_{DL\_high}$), of Frequency Range 1 (FR1) from among NR frequencies. NR operating bands may be respectively referenced by numbers, starting n, such as n1 through n90.

TABLE 1

NR operating bands in FR1

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |

TABLE 1-continued

NR operating bands in FR1

| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
|---|---|---|---|
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |

Table 2 illustrates examples of operating bands of FR2 from among the NR frequencies. NR operating bands may be respectively referenced by numbers, starting n, such as n257 through n261.

TABLE 2

NR operating bands in FR2

| Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

Table 3 illustrates examples of operating bands of E-UTRA frequencies. E-UTRA operating bands may be respectively referenced by numbers such as 1 through 88.

TABLE 3

E-UTRA operating bands

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD[2] |
| 30 | 2305 MHz-2315 MHz | 2350 MHz-2360 MHz | FDD |
| 31 | 452.5 MHz-457.5 MHz | 462.5 MHz-467.5 MHz | FDD |

TABLE 3-continued

E-UTRA operating bands

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 32 | N/A | 1452 MHz-1496 MHz | FDD[2] |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| ... | | | |
| 64 | | Reserved | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

The RAN 1 110 and the RAN 2 112 according to an embodiment of the disclosure may support one or more frequency operating bands (e.g., the NR operating band and the E-UTRA operating band) exemplified in Table 1, Table 2, or Table 3. Also, the RAN 1 110 and the RAN 2 112 according to an embodiment of the disclosure may manage one or more cells, and a single cell may support a single frequency operating band.

The AMF 121 according to an embodiment of the disclosure may exchange information about slices with the RAN 1 110 and the RAN 2 112 connected with the AMF 121, the slices being supported by the AMF 121, the RAN 1 110, and the RAN 2 112.

During an NG interface connection setup between the AMF 121 and the RAN 1 110, the AMF 121 according to an embodiment of the disclosure may add S-NSSAI A, S-NSSAI B, and S-NSSAI C to a list of S-NSSAIs supported by the AMF 121 and may transmit the list to the RAN 1 110. The RAN 1 110 may store the list of S-NSSAIs supported by the AMF 121. Also, during the NG interface connection setup between the AMF 121 and the RAN 1 110, the RAN 1 110 may add S-NSSAI A to a list of S-NSSAIs supported by the RAN 1 110, and may transmit the list to the AMF 121. The AMF 121 may store the list of S-NSSAIs supported by the RAN 1 110.

Also, during an NG interface connection setup between the AMF 121 and the RAN 2 112, the AMF 121 according to an embodiment of the disclosure may add S-NSSAI A, S-NSSAI B, and S-NSSAI C to a list of S-NSSAIs supported by the AMF 121 and may transmit the list to the RAN 2 112. The RAN 2 112 may store the list of S-NSSAIs supported by the AMF 121. Also, during the NG interface connection setup between the AMF 121 and the RAN 2 112, the RAN 2 112 may add S-NSSAI A to a list of S-NSSAIs supported by the RAN 2 112, and may transmit the list to the AMF 121. The AMF 121 may store the list of S-NSSAIs supported by the RAN 2 112.

The AMF 121 according to an embodiment of the disclosure may store, through the above procedures, information about slices supported by the RAN 1 110 and the RAN 2 112 connected to the AMF 121.

The UE according to an embodiment of the disclosure may receive a System Information Block (SIB) message from a BS adjacent to a current location of the UE 100, and the UE 100 may select a cell, based on at least one of power of a signal from the BS or information (e.g., SIB) received from the BS.

Referring to FIG. 1, the UE 100 according to an embodiment of the disclosure may be located adjacent to the RAN 1 110 and the RAN 2 112, and may receive SIB messages from the RAN 1 110 and the RAN 2 112, respectively.

Figure 2:
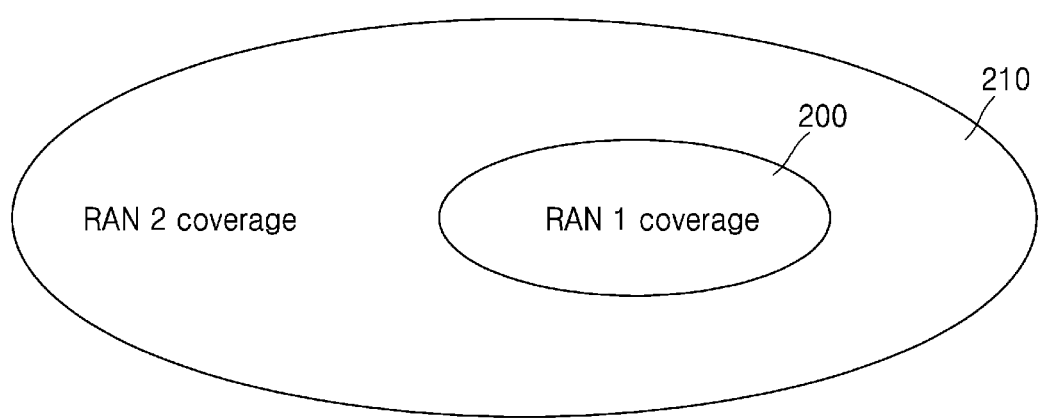
FIG. 2 illustrates cell coverage of a Radio Access Network (RAN), according to an embodiment of the disclosure.

FIG. 2 illustrates cell coverage of a RAN, according to an embodiment of the disclosure.

Referring to FIG. 2, coverage 200 of the RAN 1 110 according to an embodiment of the disclosure may be included in coverage 210 of the RAN 2 112. When the UE 100 is located in the coverage 200 of the RAN 1 110, the UE 100 may access the RAN 1 110 or the RAN 2 112. Alternatively, when the UE 100 is located in the coverage 210 of the RAN 2 112 which does not overlap the coverage 200 of the RAN 1 110, the UE 100 may access the RAN 2 112.

Embodiment 1

The 5G system according to an embodiment of the disclosure may provide a UE with information for the UE to (re)select a cell. A RAN according to an embodiment of the disclosure may store and manage radio frequency spectrum information (a radio spectrum, a radio frequency, etc.) that is allowed for each S-NSSAI. For example, the RAN may support an eMBB slice (eMBB S-NSSAI) in a frequency spectrum of 2.6 GHz NR and a frequency spectrum of 4.9 GHz NR, and may support a URLLC slice (URLLC S-NSSAI) in a frequency spectrum of 4.9 GHz NR. The RAN may store and manage operating bands of n7, n41, and n90 in a 2.4 GHz spectrum, and an operating band of n79 in a 4.9 GHz spectrum, as radio frequency information used to access the eMBB S-NSSAI. Also, the RAN may store and manage an operating band of n79 in a 4.9 GHz spectrum, as radio frequency information used to access the URLLC S-NSSAI.

Figure 3:
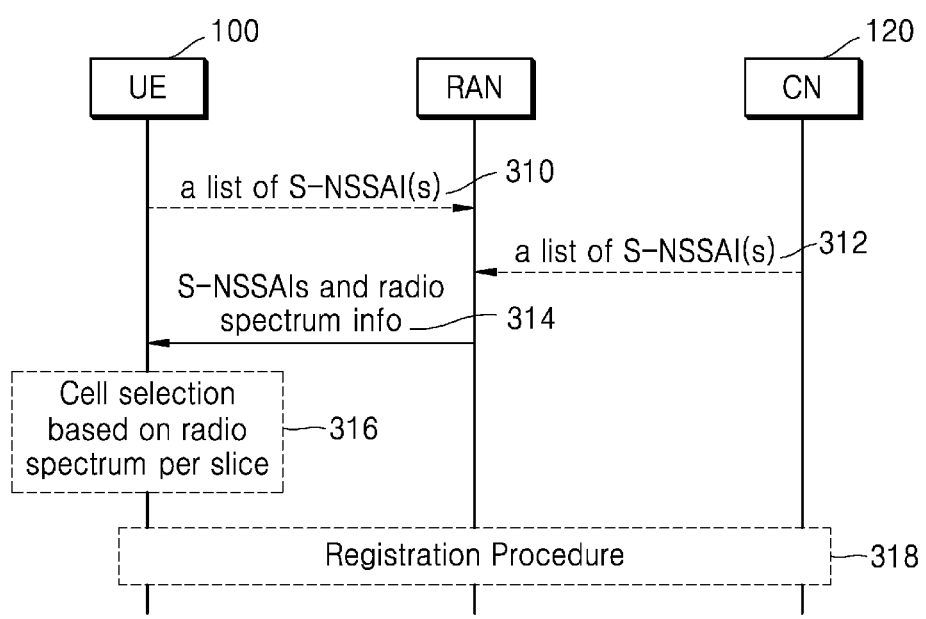
FIG. 3 illustrates a procedure of providing radio spectrum information, according to an embodiment of the disclosure.

FIG. 3 illustrates a procedure of providing radio spectrum information, according to an embodiment of the disclosure.

Referring to FIG. 3, in operation 314, a RAN according to an embodiment of the disclosure may transmit, to the UE 100, a list of S-NSSAIs supported by the RAN and information about radio frequencies for using the S-NSSAIs. A message of the RAN in operation 314 may be a SIB message. In this case, information of the message transmitted in operation 314 may be information that is not related to the UE 100. For example, the RAN 1 110 may add, to a SIB message, S-NSSAI A that is a slice supported by the RAN 1 110 and information about a radio frequency for using the S-NSSAI A, and may broadcast the SIB message. Also, the RAN 2 112 may add, to a SIB message, S-NSSAI A and S-NSSAI B that are slices supported by the RAN 2 112 and information about radio frequencies for respectively using the S-NSSAI A and the S-NSSAI B, and may broadcast the SIB message.

The UE 100 according to an embodiment of the disclosure may select, based on information received from the RAN 1 110 and the RAN 2 112 in operation 314, a RAN to be accessed by the UE 100 in operation 316. For example, the UE 100 attempting to use S-NSSAI A by accessing a network may select the RAN 1 110 or the RAN 2 112. Alternatively, the UE 100 attempting to use S-NSSAI B by accessing a network may select the RAN 2 112.

The UE 100 according to an embodiment of the disclosure may access the RAN selected in operation 316, and may perform a registration procedure in operation 318.

The UE 100 according to an embodiment of the disclosure may store the information received from the RAN and may use the information so as to reselect the RAN and a cell at a later time.

Furthermore, referring to FIG. 3, the RAN according to an embodiment of the disclosure may transmit, to the UE 100, S-NSSAI information and radio frequency information to use S-NSSAI supported by the RAN. A message of the RAN in operation 314 may be an RRC message. In this case, information of the message transmitted in operation 314 may be information related to the UE 100.

For example, in operation 310, the RAN may obtain, from the UE 100, information about requested NSSAI targeted by the UE 100. Operation 310 may occur when the UE 100 transmits a Registration Request message. In operation 312, the RAN may obtain, from the 5G core network (e.g., the AMF 121, etc.), information about allowed NSSAI to be usable by the UE 100, information about rejected S-NSSAI to not be usable by the UE 100, or information about subscribed S-NSSAIs of the UE 100. Operation 312 may occur when the AMF 121 transmits a Registration Accept message or a Registration Reject message. The RAN may configure the message to be transmitted in operation 314, based on at least one of the information received in operation 310 or the information received in operation 312. For example, when Requested NSSAI requested by the UE 100 and/or Allowed NSSAI usable by the UE 100 and/or rejected S-NSSAI(s) not usable by the UE 100 and/or subscribed S-NSSAIs to which the UE 100 subscribes include S-NSSAI A and S-NSSAI B, the RRC message to be transmitted by the RAN in operation 314 may include at least one of S-NSSAI A and S-NSSAI B or information about respective radio frequencies for using the S-NSSAI A and the S-NSSAI B. The message in operation 314 may include a Registration Accept message, a Registration Reject message, a UE Configuration Update command message, or a UE policy delivery message. However, the disclosure is not limited to the above example, and the Registration Reject message may not include S-NSSAI or radio frequency information. Also, according to an embodiment of the disclosure, the Registration Reject message may include information about a reason for rejection.

The UE 100 according to an embodiment of the disclosure may select a RAN to be accessed by the UE 100 in operation 316, based on at least one of the information (e.g., the RRC message) received from the RAN, the SIB information received from the RAN 1 110, or the SIB information received from the RAN 2 112 in operation 314. For example, the UE 100 attempting to use S-NSSAI A by accessing a network may check information about frequencies supported by the RAN 1 110 and the RAN 2 112, may determine that the RAN 1 110 and the RAN 2 112 support a radio frequency supporting S-NSSAI A, and then may select the RAN 1 110 or the RAN 2 112. Alternatively, the UE 100 attempting to use S-NSSAI B by accessing a network may check information about frequencies supported by the RAN 1 110 and the RAN 2 112, may determine that the RAN 2 112 supports a radio frequency supporting S-NSSAI B, and then may select the RAN 2 112.

The UE 100 according to an embodiment of the disclosure may access the selected RAN in operation 316, and may perform a registration procedure in operation 318.

The UE 100 according to an embodiment of the disclosure may store the information received from the RAN and may use the information so as to reselect the RAN and a cell at a later time.

Embodiment 2

The 5G system according to an embodiment of the disclosure may provide a UE with information for the UE to (re)select a cell. A RAN and/or the 5G core network according to an embodiment of the disclosure may store and manage radio frequency spectrum information (a radio spectrum, a radio frequency, etc.) that is allowed for each S-NSSAI. For example, the RAN may support an eMBB slice (eMBB S-NSSAI) in a frequency spectrum of 2.6 GHz NR and a frequency spectrum of 4.9 GHz NR, and may support a URLLC slice (URLLC S-NSSAI) in a frequency spectrum of 4.9 GHz NR. The 5G core network or the RAN may store and manage operating bands of n7, n41, and n90 in a 2.4 GHz spectrum, and an operating band of n79 in a 4.9 GHz spectrum, as radio frequency information used to access the eMBB S-NSSAI. Also, the 5G core network or the RAN may store and manage an operating band of n79 in a 4.9 GHz spectrum, as radio frequency information used to access the URLLC S-NSSAI.

Figure 4:
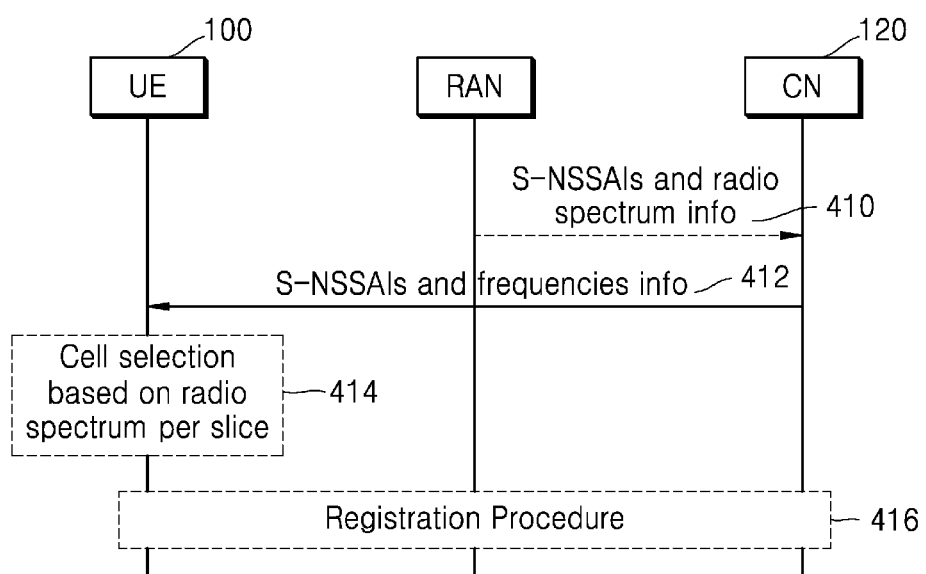
FIG. 4 illustrates a procedure of providing radio spectrum information, according to an embodiment of the disclosure.

FIG. 4 illustrates a procedure of providing radio spectrum information, according to an embodiment of the disclosure.

Referring to FIG. 4, in operation 410, a RAN according to an embodiment of the disclosure may transmit, to an NF (e.g., the AMF 121) of the 5G core network 120, a list of network slices (the list of S-NSSAIs) supported by the RAN and information about radio frequencies for respectively using the S-NSSAIs.

For example, the AMF 121 according to an embodiment of the disclosure may store, in operation 410, information about slices supported by the RAN 1 110 and the RAN 2 112 connected to the AMF 121 and information about radio frequency spectrums for respectively using S-NSSAIs. The AMF 121 may perform operation 410 with the RAN 1 110 and thus may receive, from the RAN 1 110, and store S-NSSAI A that is a slice supported by the RAN 1 110 and information about a radio frequency spectrum for using the S-NSSAI A. Also, the AMF 121 may perform operation 410 with the RAN 2 112 and thus may receive, from the RAN 2 112, and store S-NSSAI A that is a slice supported by the RAN 2 112 and information about a radio frequency spectrum for using the S-NSSAI A, and S-NSSAI B and information about a radio frequency spectrum for using the S-NSSAI B. In this regard, the information about a radio frequency spectrum for using the S-NSSAI A the AMF 121 has received from the RAN 1 110 may be equal to or different from the information about a radio frequency spectrum for using the S-NSSAI B the AMF 121 has received from the RAN 2 112.

The 5G core network 120 according to an embodiment of the disclosure may transmit, to the UE 100, information about S-NSSAI to which the UE 100 subscribes, and information about a radio frequency for using the S-NSSAI. The 5G core network 120 (or at least one NF of the 5G core network 120) may provide, to the UE 100, S-NSSAI(s) (or configured NSSAI) to which the UE 100 subscribes, and information about radio frequencies for respectively using the S-NSSAI(s), based on at least one of information about subscribed S-NSSAIs to which the UE 100 subscribes, the information being stored in the UDM 124, information about radio frequencies allowed for respective S-NSSAIs, the information being stored in the 5G core network 120, or the information about radio frequencies for respectively using S-NSSAIs, the information obtained by the 5G core network 120 from the RAN in operation 410. A message in operation 412 may be a message (e.g., a Registration Accept message, a Registration Reject message, a UE Configuration Update command message, etc.) transmitted from the AMF 121 to the UE 100. Alternatively, the message in operation 412 may be a message (e.g., a UE policy delivery message, a downlink Non-Access Stratum (NAS) transport message, etc.) transmitted from the PCF 123 to the UE 100 via the AMF 121.

The UE 100 according to an embodiment of the disclosure may store information received from the 5G core network 120 in operation 414. In operation 416, the UE 100 may select a RAN to be accessed by the UE 100, based on the received/stored information. For example, the UE 100 attempting to use S-NSSAI A by accessing a network may check information about frequencies supported by the RAN 1 110 and the RAN 2 112, may determine that the RAN 1 110 and the RAN 2 112 support a radio frequency supporting S-NSSAI A, and then may select the RAN 1 110 or the RAN 2 112. Alternatively, the UE 100 attempting to use S-NSSAI B by accessing a network may check information about frequencies supported by the RAN 1 110 and the RAN 2 112, may determine that the RAN 2 112 supports a radio frequency supporting S-NSSAI B, and then may select the RAN 2 112.

The UE 100 according to an embodiment of the disclosure may access the selected RAN in operation 414, and may perform a registration procedure in operation 416.

The UE 100 according to an embodiment of the disclosure may store the information received from the 5G core network 120 and may use the information so as to reselect a RAN and a cell at a later time.

S-NSSAI(s) transmitted in operation 412 from the 5G core network 120 (or at least one NF of the 5G core network 120) according to an embodiment of the disclosure to the UE 100 may include at least some of subscribed S-NSSAIs of the UE 100 or allowed NSSAI and allowed S-NSSAIs.

Information about radio frequencies for respectively using S-NSSAIs transmitted in operation 412 from the 5G core network 120 (or at least one NF of the 5G core network 120) according to an embodiment of the disclosure to the UE 100 may include at least some of frequencies exemplified in Table 1, Table 2, or Table 3. For example, the S-NSSAI(s) and the information about radio frequencies for respectively using S-NSSAIs transmitted in operation 412 from the 5G core network 120 (or at least one NF of the 5G core network 120) according to an embodiment of the disclosure to the UE 100 may include a list of S-NSSAIs and per S-NSSAI: a list of operating bands (or frequency bands). The S-NSSAI(s) and the information about radio frequencies for respectively using S-NSSAIs may be configured as separate information (e.g., steering of slices), may be included in configured NSSAI, or may be included in steering of roaming (SoR).

According to an embodiment of the disclosure, when the UE 100 receives information from the 5G core network 120 (or at least one NF of the 5G core network 120) in operation 412, the UE 100 may select a RAN or a cell to access, based on the received information. For example, when a radio frequency allowed for S-NSSAI A is n1, a radio frequency allowed S-NSSAI B is n257, and radio frequencies allowed S-NSSAI C are n1 and n257, the UE 100 attempting to use S-NSSAI A and/or S-NSSAI C may access a RAN or a cell which support a radio frequency of n1 (see Table 1: UL operating band: 1920 MHz-1980 MHz, DL operating band: 2110 MHz-2170 MHz) and then may request S-NSSAI A and/or S-NSSAI C (Requested NSSAI). Alternatively, the UE 100 attempting to use S-NSSAI B and/or S-NSSAI C may access a RAN or a cell which support a radio frequency of n257 (see Table 2: UL operating band: 26500 MHz-29500 MHz, DL operating band: 26500 MHz-29500 MHz) and then may request S-NSSAI B and/or S-NSSAI C (Requested NSSAI). Alternatively, the UE 100 attempting to use S-NSSAI C may access a RAN or a cell which support a radio frequency of n1 (see Table 1: UL operating band: 1920 MHz-1980 MHz, DL operating band: 2110 MHz-2170 MHz) or a radio frequency of n257 (see Table 2: UL operating band: 26500 MHz-29500 MHz, DL operating band: 26500 MHz-29500 MHz) and then may request S-NSSAI C (Requested NSSAI).

Also, according to an embodiment of the disclosure, the S-NSSAI(s) and the information about radio frequencies for respectively using S-NSSAIs transmitted in operation 412 from the 5G core network 120 (or at least one NF of the 5G core network 120) to the UE 100 may include frequency information (operating bands, frequency bands and slice information (e.g., Configured NSSAI, Allowed NSSAI, etc.) allowed for a corresponding frequency. For example, first Configured NSSAI associated with a first radio frequency (e.g., a radio frequency of n1 (see Table 1: UL operating band: 1920 MHz-1980 MHz, DL operating band: 2110 MHz-2170 MHz)) may include S-NSSAI A and S-NSSAI C, and second Configured NSSAI associated with a second radio frequency (e.g., a radio frequency of n257 (see Table 2: UL operating band: 26500 MHz-29500 MHz, DL operating band: 26500 MHz-29500 MHz)) may include S-NSSAI B and S-NSSAI C. As such, one S-NSSAI may be included in one or more Configured NSSAIs (according to the above example, S-NSSAI C) associated with different frequencies. Alternatively, one S-NSSAI may be included in one Configured NSSAI (according to the above example, S-NSSAI A and S-NSSAI B) associated with one frequency.

When the UE 100 receives the information from the 5G core network 120 (or at least one NF of the 5G core network 120) in operation 412, the UE 100 may select a RAN or a cell to access, based on the received information (OK?).

For example, when the UE 100 accesses a RAN or a cell which supports the first radio frequency, the UE 100 may configure Requested NSSAI by referring to the first Configured NSSAI based on the information received in operation 412. Alternatively, when the UE 100 accesses a RAN or a cell which supports the second radio frequency, the UE 100 may determine or configure Requested NSSAI by referring to the second Configured NSSAI based on the information received in operation 412.

Also, according to an embodiment of the disclosure, the UE 100 attempting to use S-NSSAI(s) included in the first Configured NSSAI may access or request for an access to a RAN or a cell which support the first radio frequency associated with the first Configured NSSAI, based on the information received in operation 412. When the UE 100 accesses the RAN or the cell which supports the first radio frequency, the UE 100 may determine or configure Requested NSSAI by referring to the first Configured NSSAI based on the information received in operation 412. Alternatively, the UE 100 attempting to use S-NSSAI(s) included in the second Configured NSSAI may access or request for an access to a RAN or a cell which support the second radio frequency associated with the second Configured NSSAI, based on the information received in operation 412. When the UE 100 accesses the RAN or the cell which supports the second radio frequency, the UE 100 may determine or configure Requested NSSAI by referring to the second Configured NSSAI based on the information received in operation 412.

According to an embodiment of the disclosure, the information transmitted from the 5G core network 120 (or at least one NF of the 5G core network 120) to the UE 100 in operation 412 may include a Public Land Mobile Network (PLMN) identifier (ID). For example, a PLMN ID supporting S-NSSAI that is included in the information transmitted to the UE 100 in operation 412 may be included. When the PLMN ID is not included, it may implicitly mean that a PLMN that supports S-NSSAI included in the information transmitted to the UE 100 in operation 412 is a serving PLMN.

According to an embodiment of the disclosure, information about radio frequencies for respectively using S-NSSAIs stored in the 5G core network 120 (or at least one NF of the 5G core network 120) may be configured/stored in the AMF 121 or the NSSF 126.

For example, the AMF 121 or the NSSF 126 may be configured with information about radio frequencies available for respective S-NSSAIs, by operations, administration and maintenance (OAM).

Alternatively, the AMF 121 may receive, from the NSSF 126, information about radio frequencies available for respective S-NSSAIs. According to an embodiment of the disclosure, the AMF 121 may receive, from the NSSF 126, the information about radio frequencies available for respective S-NSSAIs in a procedure not related to the UE 100. For example, the procedure not related to the UE 100 may include, but is not limited to, a NSSAI availability service.

Also, according to an embodiment of the disclosure, the AMF 121 may receive, from the NSSF 126, the information about radio frequencies available for respective S-NSSAIs in a procedure related to the UE 100. For example, the procedure related to the UE 100 may include, but is not limited to, a network slice selection service. Also, the procedure related to the UE 100 may refer to a UE registration procedure, a PDU session establishment/modification procedure, a handover procedure, a service request procedure, or the like. According to an embodiment of the disclosure, the AMF 121 may receive, from the NSSF 126, the information about radio frequencies available for respective S-NSSAIs in the UE registration procedure, the PDU session establishment/modification procedure, the handover procedure, or the service request procedure.

According to an embodiment of the disclosure, based on at least one of the UE subscription information (e.g., subscribed S-NSSAIs) received from the UDR 130, the information (e.g., the information about radio frequencies available for respective S-NSSAIs) configured by the OAM, or the information (e.g., the information about radio frequencies available for respective S-NSSAIs) received from the NSSF 126, the AMF 121 may generate information to be transmitted to the UE 100, the information including a S-NSSAI list, information about radio frequencies and/or frequencies (operating bands and frequency bands) available for respective S-NSSAIs, and information about slices (e.g., Configured NSSAI, Allowed NSSAI, etc.) available for usage with the corresponding frequencies. The AMF 121 may transmit, to the UE 100, the generated S-NSSAI list, the information about radio frequencies and/or frequencies (operating bands and frequency bands) available for respective S-NSSAIs, and the information about slices (e.g., Configured NSSAI, Allowed NSSAI, etc.) available for usage with the corresponding frequencies.

According to an embodiment of the disclosure, based on at least one of the UE subscription information (e.g., subscribed S-NSSAIs) received from the AMF 121, or the information (e.g., the information about radio frequencies available for respective S-NSSAIs) configured by the OAM, the NSSF 126 may generate information to be transmitted to the UE 100, the information including a S-NSSAI list, information about radio frequencies and/or frequencies (operating bands and frequency bands) available for respective S-NSSAIs, and information about slices (e.g., Configured NSSAI, Allowed NSSAI, etc.) available for usage with the corresponding frequencies. The NSSF 126 may transmit, to the AMF 121, the generated S-NSSAI list, the information about radio frequencies and/or frequencies (operating bands and frequency bands) available for respective S-NSSAIs, and the information about slices (e.g., Configured NSSAI, Allowed NSSAI, etc.) available for usage with the corresponding frequencies. The AMF 121 may transmit, to the UE 100, the generated S-NSSAI list, the information about radio frequencies and/or frequencies (operating bands and frequency bands) available for respective S-NSSAIs, and the information about slices (e.g., Configured NSSAI, Allowed NSSAI, etc.) available for usage with the corresponding frequencies, which are received from the NSSF 126.

Embodiment 3

The 5G system according to an embodiment of the disclosure may provide a UE with information for the UE to (re)select a cell.

Figure 5:
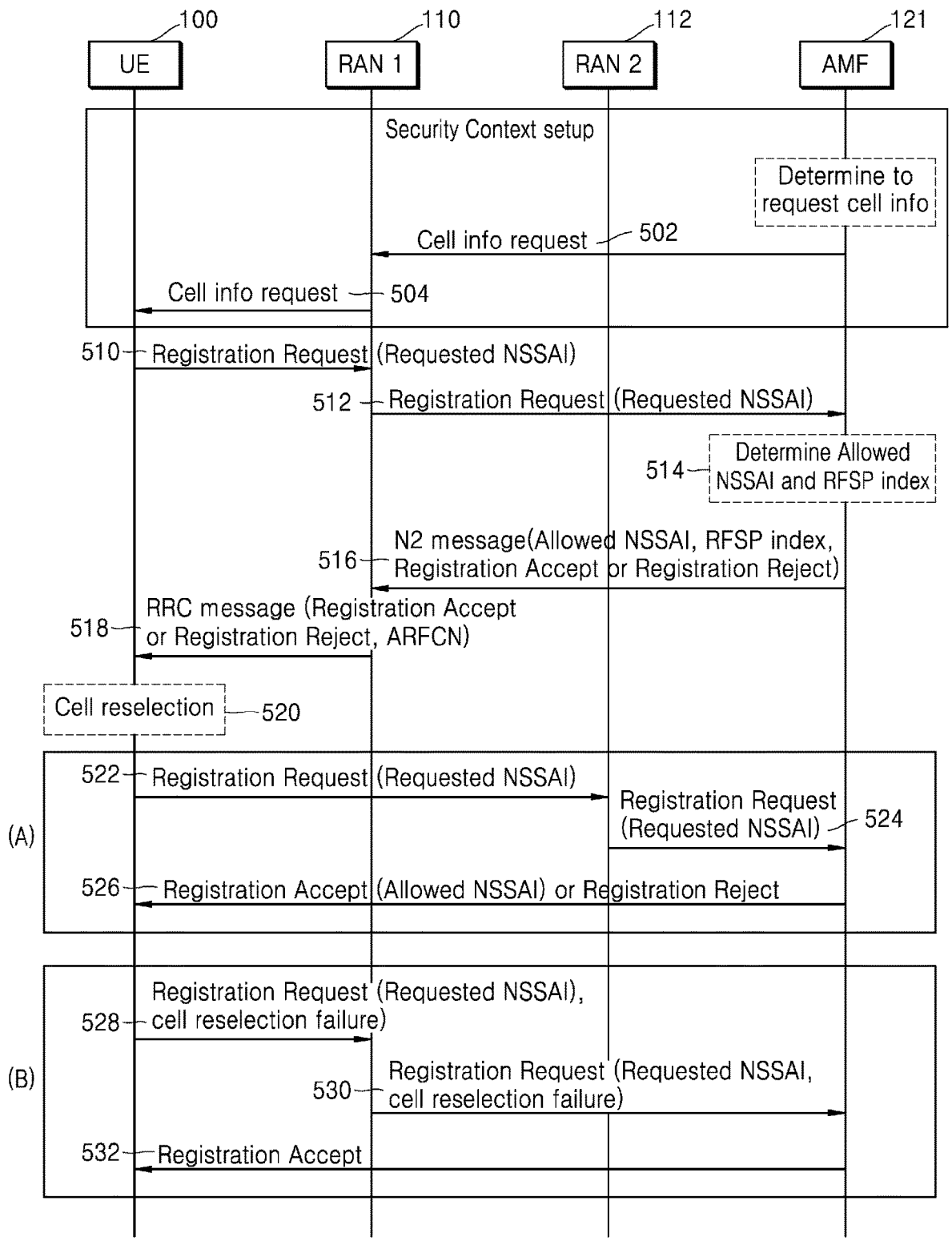
FIG. 5 illustrates a radio spectrum information provision procedure, according to an embodiment of the disclosure.

FIG. 5 illustrates a radio spectrum information provision procedure, according to an embodiment of the disclosure.

Referring to FIG. 5, the AMF 121 according to an embodiment of the disclosure may perform an initial registration procedure with the UE 100, and security context setup may be performed between the UE 100 and the AMF 121 in the initial registration procedure.

According to an embodiment of the disclosure, in operation 500 of the initial registration procedure, based on at least one of information about RANs (e.g., the RAN 1 110 and the RAN 2 112) to which the AMF 121 accesses, or information about subscribed S-NSSAIs of the UE 100, the AMF 121 may determine whether to request cell information from the UE 100 or the RAN 1 110 to which the UE 100 accesses. For example, when the subscribed S-NSSAIs of the UE 100 include S-NSSAI A and S-NSSAI B, the RAN 1 110 connected to the AMF 121 supports S-NSSAI A, and the RAN 2 112 supports S-NSSAI A and S-NSSAI B, the AMF 121 may determine that the RAN 1 110 cannot support the subscribed S-NSSAIs of the UE 100, and thus may determine to request the cell information from the UE 100 or the RAN 1 110.

In operation 502, the AMF 121 according to an embodiment of the disclosure may transmit a cell information request message to the RAN 1 110. The cell information request message of operation 502 may be included in a Registration Accept message or a Registration Reject message which are transmitted from the AMF 121 to the UE 100. Alternatively, the cell information request message of operation 502 may be included in an N2 message transmitted from the AMF 121 to the RAN 1 110.

In operation 504, the RAN 1 110 according to an embodiment of the disclosure may transmit a cell information request message to the UE 100. The cell information request message of operation 504 may be included in a Radio Resource Control (RRC) message transmitted from the RAN 1 110 to the UE 100. Alternatively, the cell information request message of operation 504 may be included in a Registration Accept message or a Registration Reject message which are transmitted from the AMF 121 to the UE 100.

According to an embodiment of the disclosure, when the UE 100 receives the cell information request message of operation 504, the UE 100 may add information about a cell/RAN to which the UE 100 can access, to a Registration Request message to be transmitted to the AMF 121 in operation 510. For example, the UE 100 at its current location may receive a SIB message from each of the RAN 1 110 and the RAN 2 112, and then may identify that the UE 100 can access the RAN 1 110 and the RAN 2 112. The UE 100 may access the RAN 1 110 that is one of currently-accessible RANs and may perform operation 510. When the UE 100 receives the cell information request message of operation 504, the UE 100 may add, to a message of operation 510, information about accessible RANs other than the RAN 1 110 to which the UE 100 currently accesses, i.e., information about the RAN 2 112 (e.g., RAN ID, Cell ID, etc.).

According to an embodiment of the disclosure, when the RAN 1 110 receives the cell information request message of operation 502, the RAN 1 110 may add information about a cell/RAN neighboring the RAN 1 110 to a Registration Request message to be transmitted to the AMF 121 in operation 512. For example, the RAN 1 110 is adjacent to the RAN 2 112, and thus the message of operation 512 may include information about the RAN 2 112 (e.g., RAN ID, Cell ID, etc.).

In operation 514, the AMF 121 according to an embodiment of the disclosure may determine Allowed NSSAI and a RAT Frequency Selection Priority (RFSP) index to be provided to the UE 100, based on the information received from the UE 100 or the RAN 1 110.

For example, when Requested NSSAI the UE 100 requested in operations 510 and 512 includes S-NSSAI A, the AMF 121 knows that the RAN 1 110 to which the UE 100 currently accesses supports S-NSSAI A, and thus may allow the request of the UE 100 by adding S-NSSAI A to Allowed NSSAI.

Alternatively, for example, when Requested NSSAI the UE 100 requested in operations 510 and 512 includes S-NSSAI B, the AMF 121 knows that the RAN 1 110 to which the UE 100 currently accesses cannot support S-NSSAI B, and thus may determine to perform cell reselection. Because S-NSSAI B is not supported by the RAN 1 110 to which the UE 100 currently accesses, the AMF 121 may add S-NSSAI B to rejected S-NSSAI. The AMF 121 knows that the RAN 2 112 supports S-NSSAI B, and may determine a value of the RFSP index, in consideration of S-NSSAI B. In order to determine the value of the RFSP index, the AMF 121 may provide, to the PCF 123, S-NSSAI B (e.g., marked as rejected S-NSSAI), and a value of a subscribed RFSP index obtained by the AMF 121 from the UDM 124. The PCF 123 may determine a value of a RFSP index supporting S-NSSAI B, based on the received information, and may transmit the determined value of the RFSP index to the AMF 121. The AMF 121 may use the RFSP index received from the PCF 123.

According to an embodiment of the disclosure, information about radio frequencies for respectively using S-NSSAIs stored in the 5G core network 120 (or at least one NF of the 5G core network 120) may be configured/stored in the AMF 121 or the PCF 123.

For example, the AMF 121 or the PCF 123 may be configured with information about radio frequencies available for respective S-NSSAIs, by OAM.

According to an embodiment of the disclosure, the AMF 121 may determine the RFSP index, based on at least one of Requested NSSAI, Allowed NSSAI, rejected S-NSSAI(s), subscribed S-NSSAI(s), a subscribed RFSP index, an operator policy, or the information about radio frequencies available for respective S-NSSAIs.

According to an embodiment of the disclosure, the Requested NSSAI may refer to information received by the AMF 121 from the UE 100.

Also, according to an embodiment of the disclosure, the Allowed NSSAI and the rejected S-NSSAI(s) may refer to information determined by the AMF 121 or the NSSF 126.

The Rejected S-NSSAI(s) may include S-NSSAI that is not supported by the RAN 1 110 to which the UE 100 currently accesses but is supportable by the RAN 2 112.

Also, according to an embodiment of the disclosure, the subscribed S-NSSAI(s) and the subscribed RFSP index may refer to information received by the AMF 121 from the UDM 124.

According to an embodiment of the disclosure, the AMF 121 may add at least one of the Requested NSSAI, the Allowed NSSAI, the rejected S-NSSAI(s), the subscribed S-NSSAI(s), or the subscribed RFSP index to a message to be transmitted to the PCF 123. The message to be transmitted form the AMF 121 to the PCF 123 may include an Npcf_AMPolicyControl_Create Request message, an Npcf_AMPolicyControl_Update Request message, and the like. However, the message is not limited to the aforementioned message names.

According to an embodiment of the disclosure, the Requested NSSAI may refer to information received by the AMF 121 from the UE 100.

Also, according to an embodiment of the disclosure, the Allowed NSSAI and the rejected S-NSSAI(s) may refer to information determined by the AMF 121 and the NSSF 126. The Rejected S-NSSAI(s) may include S-NSSAI that is not supported by the RAN 1 110 to which the UE 100 currently accesses but is supportable by the RAN 2 112.

Also, according to an embodiment of the disclosure, the subscribed S-NSSAI(s) and the subscribed RFSP index may refer to information received by the AMF 121 from the UDM 124.

According to an embodiment of the disclosure, the PCF 123 may determine the RFSP index, based on at least one of the Requested NSSAI, the Allowed NSSAI, the rejected S-NSSAI(s), the subscribed S-NSSAI(s), the subscribed RFSP index, the operator policy, or the information about radio frequencies available for respective S-NSSAIs, which are received from the AMF 121. A message to be transmitted from the PCF 123 to the AMF 121 may include the RFSP index determined by the PCF 123. The message to be transmitted from the PCF 123 to the AMF 121 may include an Npcf_AMPolicyControl_Create Response message, an Npcf_AMPolicyControl_Update Response message, and the like. However, the message is not limited to the aforementioned names.

In operation 516, the AMF 121 according to an embodiment of the disclosure may transmit a N2 message to the RAN 1 110. The N2 message may include RFSP index information obtained by the AMF 121 from the PCF 123 in operation 514. The RAN 1 110 may determine an Absolute Radio Frequency Channel Number (ARFCN) that is mapped to the received RFSP index.

Also, according to an embodiment of the disclosure, the AMF 121 may transmit a N2 message to the RAN 1 110. The N2 message may include the RFSP index information determined by the AMF 121 in operation 514. The RAN 1 110 may determine an ARFCN that is mapped to the received RFSP index.

According to an embodiment of the disclosure, the N2 message transmitted by the AMF 121 in operation 516 may include a NAS message (e.g., a Registration Accept message, a Registration Reject message, etc.). The NAS message may include Registration Area (RA) information. The RA information may include a Tracking Area Identifier (TAI) list including one or more TAIs.

For example, the RA information included in the NAS message may include a specific TAI. The specific TAI may be referred to as a non-broadcast TAI. The non-broadcast TAI may be a TAI that is not broadcast by a RAN. Alternatively, a RA included in the NAS message may not include any TAI. The RA that does not include any TAI may be referred to as an empty RA or an empty TAI. The reason the AMF 121 adds the specific TAI (e.g., the non-broadcast TAI) or the empty RA (or the empty TAI) to the NAS message may be to indicate or control the UE 100 to re-perform a registration procedure, when the UE 100 receives the NAS message.

According to an embodiment of the disclosure, the N2 message transmitted by the AMF 121 in operation 516 may include the NAS message (e.g., a Registration Accept message, a Registration Reject message, etc.). The NAS message may include information indicating that a registration procedure is requested (e.g., an indication parameter indicating whether a Registration procedure is requested).

The reason the AMF 121 includes such indicator (e.g., the indication parameter indicating whether a Registration procedure is requested) may be to indicate or control the UE 100 to re-perform a registration procedure, when the UE 100 receives the NAS message.

According to an embodiment of the disclosure, the N2 message transmitted by the AMF 121 in operation 516 may include a NAS message (e.g., a Registration Accept message, a Registration Reject message, etc.). The NAS message may include rejected S-NSSAI(s).

For example, when the Requested NSSAI the UE 100 requested in operations 510 and 512 includes S-NSSAI B, the AMF 121 knows that the RAN 1 110 to which the UE 100 currently accesses cannot support S-NSSAI B, and thus may determine to perform cell reselection. Because S-NSSAI B is not supported by the RAN 1 110 to which the UE 100 currently accesses, the AMF 121 may add S-NSSAI B to rejected S-NSSAI. The AMF 121 may add a rejection cause value of the rejected S-NSSAI to the NAS message. The rejection cause value of the rejected S-NSSAI may refer to information indicating that corresponding S-NSSAI is not temporarily serviced or corresponding S-NSSAI is serviced by another RAN or in another frequency.

According to an embodiment of the disclosure, the N2 message transmitted by the AMF 121 in operation 516 may include a NAS message (e.g., a Registration Accept message, a Registration Reject message, etc.). The NAS message may include RAN information (e.g., a RAN ID, etc.).

For example, when the Requested NSSAI the UE 100 requested in operations 510 and 512 includes S-NSSAI B, the AMF 121 knows that the RAN 1 110 to which the UE 100 currently accesses cannot support S-NSSAI B, and thus may determine to perform cell reselection. The AMF 121 may know that S-NSSAI B requested by the UE 100 is supported by the RAN 2 112, based on information received from the RAN in operation 410 of FIG. 4 or local configuration information (e.g., information configured by the OAM) of the AMF 121, and may add information about the RAN 2 112 to the NAS message. Alternatively, the AMF 121 may know information about a frequency for supporting S-NSSAI B requested by the UE 100, based on information received from the RAN in operation 410 of FIG. 4 or local configuration information (e.g., information configured by the OAM) of the AMF 121, and may add, to the NAS message, the information about the frequency for supporting S-NSSAI B requested by the UE 100.

According to an embodiment of the disclosure, the N2 message transmitted by the AMF 121 in operation 516 may include a UE CONTEXT RELEASE COMMAND message. However, the message is not limited to the aforementioned message name. The reason the AMF 121 adds the UE CONTEXT RELEASE COMMAND message to the N2 message may be to indicate or control release of Access Node (AN) connection between the UE 100 and the RAN 1 110. Also, the reason the AMF 121 adds the UE CONTEXT RELEASE COMMAND message to the N2 message may be to indicate or control the UE 100 to select the RAN 2 112 based on information (e.g., the ARFCN) received from the RAN 1 110 and re-perform a registration procedure, when the RAN 1 110 releases the AN connection to the UE 100.

According to an embodiment of the disclosure, the AMF 121 may transmit a De-registration request message or a UE Configuration Update Command message to the UE 100. The UE Configuration Update Command message may include information indicating that a registration procedure is requested (e.g., an indication parameter indicating whether a Registration procedure is requested). The reason the AMF 121 transmits, to the UE 100, the De-registration request message or the UE Configuration Update Command message including a corresponding indicator (e.g., the indication parameter indicating whether a Registration procedure is requested) may be to indicate or control the UE 100 to re-perform a registration procedure, when the UE 100 receives the message.

The RAN 1 110 according to an embodiment of the disclosure may transmit an RRC message to the UE 100 in operation 518. The RRC message may include ARFCN information about the ARFCN determined by the RAN 1 110 in operation 514.

When the RAN 1 110 according to an embodiment of the disclosure receives the UE CONTEXT RELEASE COMMAND message from the AMF 121 in operation 516, the RAN 1 110 may release the AN connection to the UE 100.

In operation 520, the UE 100 according to an embodiment of the disclosure may receive the NAS message transmitted by the AMF 121 in operation 518. When the NAS message transmitted by the AMF 121 includes the rejection cause value of the rejected S-NSSAI, the UE 100 may know, based on the cause value, the reason the corresponding S-NSSAI has been rejected. For example, when the rejection cause value of the rejected S-NSSAI corresponds to information indicating that corresponding S-NSSAI is not temporarily serviced or corresponding S-NSSAI is serviced by another RAN or in another frequency, the UE 100 may know that the rejected S-NSSAI is not serviced in the RAN 1 110 to which the UE 100 currently accesses or in a frequency the UE 100 currently uses. Accordingly, the UE 100 may determine to use another RAN or another frequency.

In operation 520, the UE 100 according to an embodiment of the disclosure may receive the NAS message transmitted by the AMF 121 in operation 518. When the NAS message transmitted by the AMF 121 includes a RA (e.g., the specific TAI such as the non-broadcast TAI), the UE 100 may compare TAI broadcast by the RAN 1 110 with the TAI included in the NAS message, and when not matched, the UE 100 may determine to re-perform a registration procedure.

In operation 520, the UE 100 according to an embodiment of the disclosure may receive the NAS message transmitted by the AMF 121 in operation 518. When the NAS message transmitted by the AMF 121 includes an empty RA or the RA includes an empty RA, the UE 100 may determine to re-perform a registration procedure.

In operation 520, the UE 100 according to an embodiment of the disclosure may receive the NAS message transmitted by the AMF 121 in operation 518. When the NAS message transmitted by the AMF 121 includes information indicating that a registration procedure is requested (e.g., an indication parameter indicating whether a Registration procedure is requested), the UE 100 may determine to re-perform the registration procedure.

In operation 520, the UE 100 according to an embodiment of the disclosure may receive the NAS message transmitted by the AMF 121 in operation 518. When the NAS message transmitted by the AMF 121 includes RAN information, the UE 100 may compare the RAN 1 110 to which the UE 100 currently accesses with the RAN information included in the NAS message, and when not matched, the UE 100 may determine to re-perform RAN reselection and/or registration procedure.

In operation 520, the UE 100 according to an embodiment of the disclosure may receive the NAS message transmitted by the AMF 121 in operation 518. When the NAS message transmitted by the AMF 121 includes frequency information, the UE 100 may compare a frequency supported by the RAN 1 110 to which the UE 100 currently accesses or a frequency the UE 100 currently uses with the frequency information included in the NAS message, and when not matched, the UE 100 may determine to re-perform frequency (RAN) reselection and/or registration procedure.

The UE 100 according to an embodiment of the disclosure may receive the De-registration request message from the AMF 121. Accordingly, the UE 100 may determine to re-perform a registration procedure.

The UE 100 according to an embodiment of the disclosure may receive the UE Configuration Update Command message from the AMF 121. When the UE Configuration Update Command message includes specific information (e.g., an indication parameter indicating whether a Registration procedure is requested), the UE 100 may determine to re-perform a registration procedure.

In operation 520, the UE 100 according to an embodiment of the disclosure may perform a cell reselection procedure, based on the ARFCN information received in operation 518. For example, the UE 100 may determine that frequency information indicated by the ARFCN information corresponds to a frequency supported by the RAN 2 112, and may determine to access the RAN 2 112.

In operation 520, the UE 100 according to an embodiment of the disclosure may perform a cell reselection procedure, based on the frequency information received in operation 518. For example, the UE 100 may determine that a frequency indicated by the frequency information corresponds to a frequency supported by the RAN 2 112, and may access the RAN 2 112.

In operation 520, the UE 100 according to an embodiment of the disclosure may perform a cell reselection procedure, based on the RAN information received in operation 518. For example, the UE 100 may determine that a RAN indicated by the RAN information corresponds to the RAN 2 112, and may access the RAN 2 112.

The UE 100 according to an embodiment of the disclosure may access the RAN 2 112 selected in operation 520, and may transmit a Registration Request message in operation 522. The Registration Request message may include S-NSSAI B as Requested NSSAI. In operation 524, the RAN 2 112 may transmit, to the AMF 121, the Registration Request message received from the UE 100. The AMF 121 may process the Registration Request message, and may transmit a Registration Accept message to the UE 100. The Registration Accept message may include S-NSSAI B as Allowed NSSAI. Through this procedure, the 5G system may control the UE 100 to access the RAN 2 112 capable of supporting S-NSSAI B requested by the UE 100.

S-NSSAI included in the Requested NSSAI transmitted by the UE 100 in operation 522 may include at least some of the rejected S-NSSAI(s) received in operation 518. Alternatively, or in addition, S-NSSAI included in the Requested NSSAI transmitted by the UE 100 in operation 522 may include at least some of the S-NSSAI(s) included in the Allowed NSSAI received in operation 518.

The UE 100 according to an embodiment of the disclosure may fail to reselect a cell in operation 520. For example, in operation 520, the UE 100 may determine that cell/RAN that satisfy the ARFCN information received in operation 518 are not present. Alternatively, in operation 526, the UE 100 may receive a Registration Reject message from the AMF 121. In operation 528, the UE 100 may re-access the RAN 1 110 and may transmit a Registration Request message to the AMF 121. The message in operation 528 may include an indicator indicating that the UE 100 performed cell reselection based on the information received in operation 518 but failed. In operation 530, the RAN 1 110 may transmit, to the AMF 121, the Registration Request message received from the UE 100.

The AMF 121 according to an embodiment of the disclosure may identify that a cell reselection failure indicator is included in the received Registration Request message, and may determine to not control the UE 100 to access another RAN and may determine to process the Registration Request message received in operation 530. The AMF 121 may process the Registration Request message, and in operation 532, the AMF 121 may transmit a Registration Accept message to the UE 100.

Embodiment 4

The 5G system according to an embodiment of the disclosure may provide a UE with information for the UE to (re)select a cell. In order to describe a preset embodiment of the disclosure, it is assumed that the RAN 1 110 can support S-NSSAI A, and the RAN 2 112 can support S-NSSAI A and S-NSSAI B.

Figure 6:
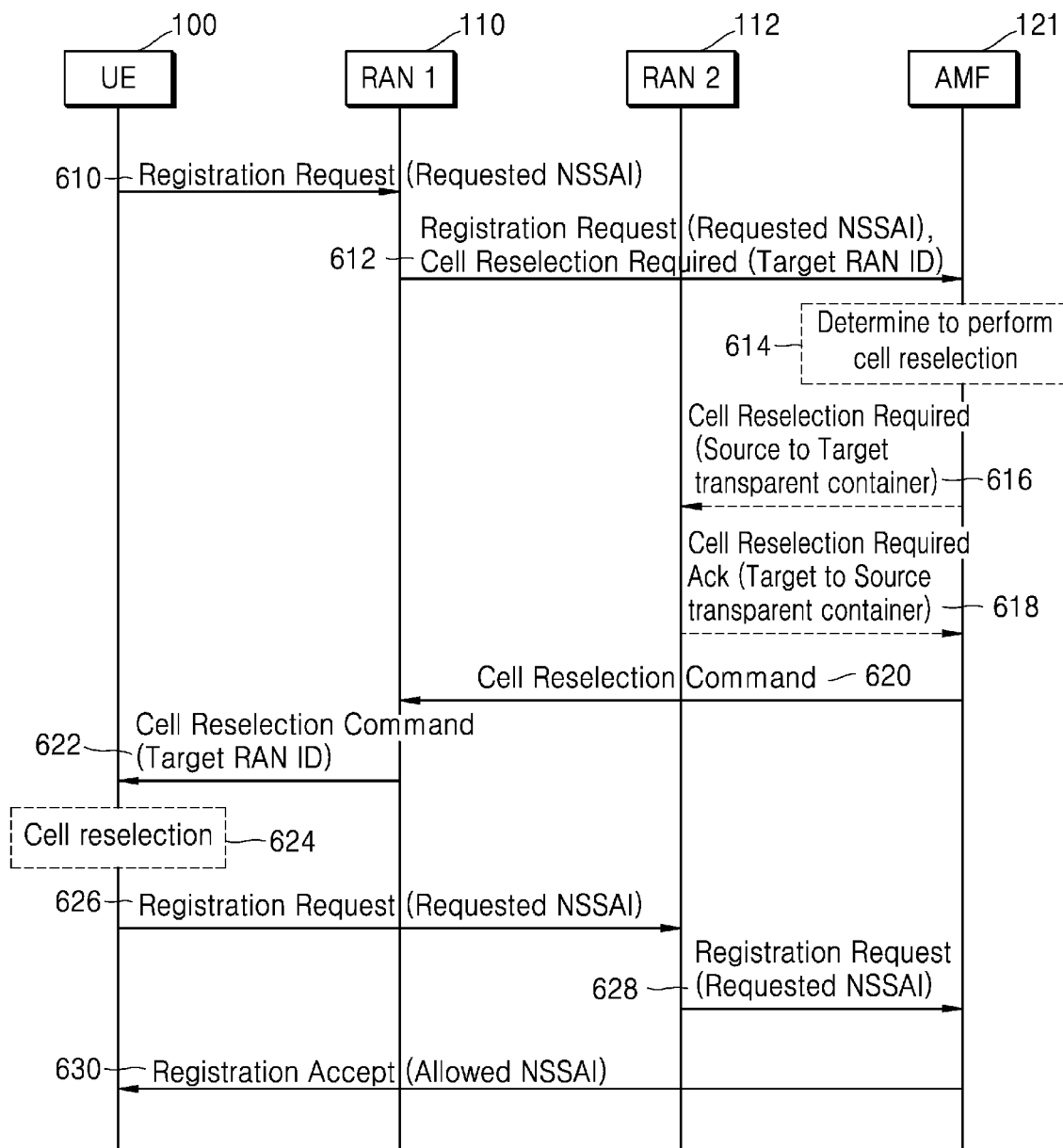
FIG. 6 illustrates a RAN information provision procedure, according to an embodiment of the disclosure.

FIG. 6 illustrates a RAN information provision procedure, according to an embodiment of the disclosure.

Referring to FIG. 6, the UE 100 according to an embodiment of the disclosure may access the RAN 1 110, and in operation 610, the UE 100 may transmit a Registration Request message. The Registration Request message may include S-NSSAI B as Requested NSSAI the UE 100 desires to use.

According to an embodiment of the disclosure, when the RAN 1 110 receives the Registration Request message, the RAN 1 110 may determine whether the RAN 1 110 can support the Requested NSSAI received from the UE 100. For example, when the RAN 1 110 cannot support the S-NSSAI B, the RAN 1 110 may determine, from among neighboring RANs, the RAN 2 112 as a RAN capable of supporting the S-NSSAI B requested by the UE 100. Accordingly, in operation 612, the RAN 1 110 may transmit both the Registration Request message and a Cell Reselection Required message to the AMF 121. The Cell Reselection Required message may include target RAN information determined by the RAN 1 110, e.g., RAN ID or Cell ID indicating the RAN 2 112.

Also, according to an embodiment of the disclosure, the Cell Reselection Required message may include a Direct Forwarding Path Availability indication indicating whether direct communication between the RAN 1 110 and the RAN 2 112 that is a target RAN. When direct connection between the RAN 1 110 and the RAN 2 112 is unavailable (e.g., Xn connection between the RAN 1 110 and the RAN 2 112 is not configured), the RAN 1 110 may mark a Direct Forwarding Path Availability indication as unavailable, and may add, to a Source to Target transparent container, information the RAN 1 110 desires to transmit to the RAN 2 112, and may transmit that information to the AMF 121.

According to an embodiment of the disclosure, the AMF 121 may determine whether to perform a cell reselection procedure in operation 614, based on the information received in operation 612. For example, when the information received from the RAN 1 110 includes the Cell Reselection Required message, the AMF 121 may determine to perform the cell reselection procedure. Also, when the Direct Forwarding Path Availability indication included in the information received from the RAN 1 110 is marked as unavailable, the AMF 121 may determine to perform operation 616. However, when the Direct Forwarding Path Availability indication is marked as availability, the AMF 121 may not perform operations 616 and 618 but may perform operation 620.

According to an embodiment of the disclosure, the AMF 121 may transmit the Cell Reselection Required message of operation 616 to the RAN 2 112 that corresponds to the Target RAN ID received in operation 612. The Cell Reselection Required message may include the Source to Target transparent container received by the AMF 121 from the RAN 2 112 in operation 612.

According to an embodiment of the disclosure, the RAN 2 112 may determine that cell reselection is requested, based on the information received in operation 616. When the RAN 2 112 is able to perform a cell reselection procedure, the RAN 2 112 may transmit a Cell Reselection Required Ack message to the AMF 121 in operation 618. The Cell Reselection Required Ack message may include a Target to Source transparent container message including information the RAN 2 112 that is the target RAN desires to transmit to the RAN 1 110 that is a source RAN.

According to an embodiment of the disclosure, in operation 620, the AMF 121 may transmit a Cell Reselection Command message to the RAN 1 110. When the AMF 121 has performed operations 616 and 618, the AMF 121 may add, to the message of operation 620, the Target to Source transparent container message received from the RAN 2 112 in operation 618, and may transmit the message to the RAN 1 110.

According to an embodiment of the disclosure, the RAN 1 110 may receive the Cell Reselection Command message of operation 620 and thus may determine to perform a cell reselection procedure. Accordingly, the RAN 1 110 may add the Cell Reselection Command message to an RRC message to be transmitted to the UE 100 in operation 622. The Cell Reselection Command message may include information about a target RAN, e.g., RAN ID or Cell ID indicating the RAN 2 112, to which the UE 100 is requested to access. Also, the Cell Reselection Command message may include information to be transmitted to the UE 100 from the RAN 2 112.

According to an embodiment of the disclosure, the information to be transmitted to the UE 100 from the RAN 2 112 may refer to the Target to Source transparent container information received by the RAN 1 110 from the AMF 121 or the information received by the RAN 1 110 from the RAN 2 112 via Xn connection between the RAN 1 110 and the RAN 2 112. According to an embodiment of the disclosure, before the UE 100 accesses the RAN 2 112 (i.e., before the UE 100 performs operation 624), the UE 100 may receive and process the information to be transmitted to the UE 100 from the RAN 2 112 via the RAN 1 110, such that the UE 100 may rapidly perform a cell reselection procedure on the RAN 2 112 in operation 624 or may skip operation 624. When the UE 100 did not receive the information to be transmitted to the UE 100 from the RAN 2 112 via the RAN 1 110, the UE 100 may receive a SIB message from the RAN 2 112 indicated by the Target RAN ID in operation 624, and may then may receive the information to be transmitted to the UE 100 from the RAN 2 112.

According to an embodiment of the disclosure, the UE 100 may perform a cell reselection procedure in operation 624, based on the information received in operation 622. For example, the UE 100 may access the RAN 2 112 that corresponds to Target RAN ID received in operation 622.

After the UE 100 performs the cell reselection procedure in operation 624, the UE 100 may transmit a Registration Request message for the AMF 121 to the RAN 2 112 that corresponds to the Target RAN ID received in operation 626. The Registration Request message may include S-NSSAI B as Requested NSSAI the UE 100 desires to use.

According to an embodiment of the disclosure, when the RAN 2 112 receives the Registration Request message, the RAN 2 112 may determine whether the RAN 2 112 can support the Requested NSSAI received from the UE 100. For example, when the RAN 2 112 can support S-NSSAI B, a message to be transmitted from the RAN 2 112 to the AMF 121 in operation 628 may include only the Registration Request message and may not include the Cell Reselection Required message.

According to an embodiment of the disclosure, in operation 628, the AMF 121 may determine a slice being usable by the UE 100, based on at least one of Requested NSSAI received from the UE 100, a list of slices supported by the RAN 2 112, or information about subscribed S-NSSAIs of the UE 100. For example, when the Requested NSSAI and the subscribed S-NSSAIs include S-NSSAI B, and the RAN 2 112 can support the S-NSSAI B, the AMF 121 may include the S-NSSAI B as Allowed NSSAI being usable by the UE 100. In operation 630, the AMF 121 may transmit a Registration Accept message to the UE 100. The Registration Accept message may include the Allowed NSSAI. Through this procedure, the 5G system may control the UE 100 to access the RAN 2 112 capable of supporting S-NSSAI B requested by the UE 100.

Embodiment 5

Figure 7:
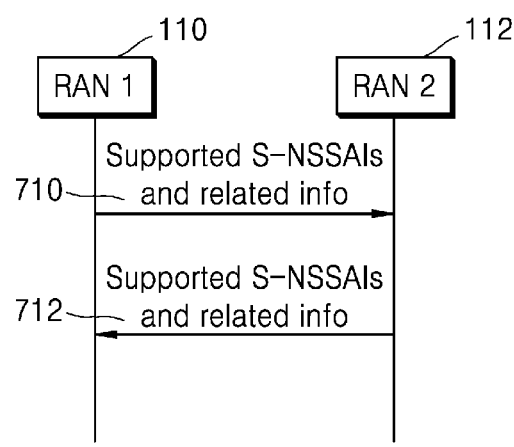
FIG. 7 illustrates a procedure of exchanging information about supported slices between RANs, according to an embodiment of the disclosure.

FIG. 7 illustrates a procedure of exchanging information about supported slices between RANs, according to an embodiment of the disclosure.

Referring to FIG. 7, the RAN 1 110 according to an embodiment of the disclosure may perform a setup procedure of an Xn interface with the neighboring RAN 2 112. A message to be transmitted from the RAN 1 110 to the RAN 2 112 in operation 710 may include a list of S-NSSAIs supported by the RAN 1 110. Also, the message of operation 710 may include radio frequency information for using the S-NSSAIs supported by the RAN 1 110. Also, the message of operation 710 may include information of the RAN 1 110 (e.g., RAN ID, Cell ID, etc.).

A message to be transmitted from the RAN 2 112 according to an embodiment of the disclosure to the RAN 1 110 in operation 712 may include a list of S-NSSAIs supported by the RAN 2 112. Also, the message of operation 712 may include radio frequency information for using the S-NSSAIs supported by the RAN 2 112. Also, the message of operation 712 may include information of the RAN 2 112 (e.g., RAN ID, Cell ID, etc.).

The RAN 1 110 according to an embodiment of the disclosure may add, to the message of operation 612 of FIG. 6, ID (e.g., RAN ID, Cell ID, etc.) as Target RAN ID indicating the RAN 2 112, based on the information received in operation 710. Also, the RAN 1 110 according to an embodiment of the disclosure may add, to the message of operation 622 of FIG. 6, information related to the RAN 2 112 (e.g., RAN ID, Cell ID, etc.), based on the information received in operation 710. Also, the RAN 1 110 according to an embodiment of the disclosure may add, to the message of operation 512 of FIG. 5, information related to the RAN 2 112 (e.g., RAN ID, Cell ID, etc.), based on the information received in operation 710.

Figure 8:
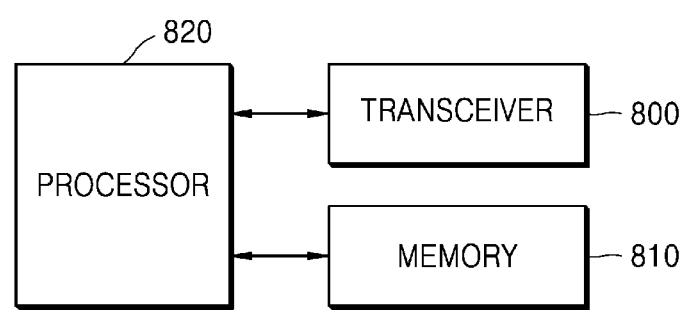
FIG. 8 illustrates a configuration of a user equipment (UE), according to an embodiment of the disclosure.

FIG. 8 illustrates a configuration of a UE, according to an embodiment of the disclosure.

The UE according to an embodiment of the disclosure may include a processor 820 controlling all operations of the UE, a transceiver 800 including a transmitter and a receiver, and a memory 810. However, the configuration of the UE is not limited to the example, and the UE may include more elements or fewer elements than the elements illustrated in FIG. 8.

According to an embodiment of the disclosure, the transceiver 800 may transmit or receive a signal to or from a network entity or another UE. The signal transmitted to or received from the network entity (or the other UE) may include control information and data. Also, the transceiver 800 may receive signals through wireless channels and output the signals to the processor 820, and may transmit signals output from the processor 820, through wireless channels.

According to an embodiment of the disclosure, the processor 820 may control the UE to perform operations of one of the embodiments of the disclosure. The processor 820, the memory 810, and the transceiver 800 may not be necessarily implemented as separate modules, and may be implemented as one configuration unit such as a single chip. Furthermore, the processor 820 and the transceiver 800 may be electrically connected to each other. The processor 820 may refer to an application processor (AP), a communication processor (CP), a circuit, an application-specific circuit, or at least one processor.

According to an embodiment of the disclosure, the memory 810 may store basic programs, application programs, and data such as configuration information, etc. for operations of the UE. In particular, the memory 810 provides stored data, in response to a request of the processor 820. The memory 810 may be implemented as a storage medium including a read only memory (ROM), a random access memory (RAM), a hard disk, a compact disc (CD)-ROM, a digital versatile disc (DVD), or the like, or any combination thereof. Also, the memory 810 may refer to a plurality of memories. Furthermore, the processor 820 may perform the aforementioned embodiments of the disclosure based on at least one program for performing the aforementioned embodiments of the disclosure, the at least one program being stored in the memory 810.

Figure 9:
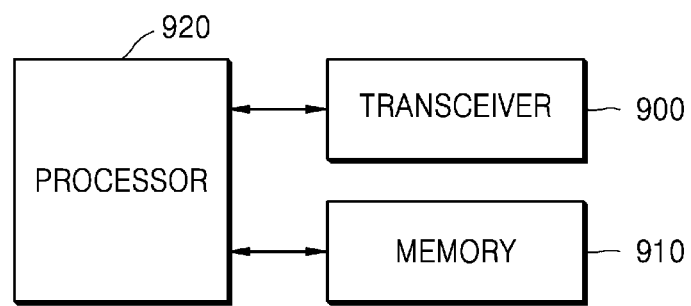
FIG. 9 illustrates a configuration of a network entity, according to an embodiment of the disclosure.

FIG. 9 illustrates a configuration of a network entity, according to an embodiment of the disclosure.

The network entity according to an embodiment of the disclosure may include a processor 920 controlling all operations of the network entity, a transceiver 900 including a transmitter and a receiver, and a memory 910. However, the configuration of the network entity is not limited to the example, and the network entity may include more elements or fewer elements than the elements illustrated in FIG. 9.

According to an embodiment of the disclosure, the transceiver 900 may transmit or receive a signal to or from at least one of other network entities or a UE. The signal transmitted to or received from at least one of the other network entities or the UE may include control information and data.

According to an embodiment of the disclosure, the processor 920 may control the network entity to perform operations of one of the embodiments of the disclosure. The processor 920, the memory 910, and the transceiver 900 may not be necessarily implemented as separate modules, and may be implemented as one configuration unit such as a single chip. Furthermore, the processor 920 and the transceiver 900 may be electrically connected to each other. The processor 820 may refer to an AP, a CP, a circuit, an application-specific circuit, or at least one processor.

According to an embodiment of the disclosure, the memory 910 may store basic programs, application programs, and data such as configuration information, etc. for operations of the network entity. In particular, the memory 910 provides stored data, in response to a request of the processor 920. The memory 910 may be implemented as a storage medium including a ROM, a RAM, a hard disk, a CD-ROM, a DVD, or the like, or any combination thereof. Also, the memory 910 may refer to a plurality of memories. Furthermore, the processor 920 may perform the aforementioned embodiments of the disclosure based on at least one program for performing the aforementioned embodiments of the disclosure, the at least one program being stored in the memory 910.

The configuration diagram, the exemplary diagrams of a method of transmitting a control signal or a data signal, the exemplary diagrams of operation procedures, and the configuration diagrams are not intended to limit the scope of the disclosure. That is, all configuration units, entities, or operations described in the embodiments of the disclosure should not be constructed as necessary elements for implementing the disclosure, and the embodiments of the disclosure including only some elements may be implemented without damaging the concept of the disclosure. Also, the embodiments of the disclosure may be combined to be implemented, when required. For example, the network entity and the UE may be operated in a manner that portions of methods proposed in the disclosure are combined with each other.

The aforementioned operations of the BS or the UE may be implemented in a manner that a memory device storing corresponding program codes is arranged in a random configuration unit in the BS or the UE. That is, a controller in the BS or the UE may execute the aforementioned operations by controlling a processor or a central processing unit (CPU) of the BS or the UE to read and thus to execute the program codes stored in the memory device.

Various configuration units, modules, or the like of the entity, the BS, or the UE, which are described in the present specification, may operate by using a hardware circuit including a complementary metal-oxide semiconductor (CMOS)-based logic circuit, firmware, software, and/or a hardware circuit such as a combination of hardware and firmware and/or software inserted into a machine-readable medium. For example, various electric structures and methods may be implemented by using transistors, logic gates, and electric circuits such as application-specific semiconductors.

When the methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments of the disclosure described in the claims or the detailed description.

The programs (e.g., software modules or software) may be stored in RAM, non-volatile memory including flash memory, ROM, electrically erasable programmable read-only memory (EEPROM), a magnetic disc storage device, a CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

According to an embodiment of the disclosure, provided are a method and apparatus for effectively providing a service in a wireless communication system.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Specific embodiments of the disclosure have been described in the descriptions of the disclosure, but it will be understood that various modifications can be made without departing the scope of the disclosure. Thus, it will be apparent to one of ordinary skill in the art that the scope of the disclosure is not limited to the embodiments described herein and should be defined by the appended claims and their equivalents. In other words, it will be apparent to one of ordinary skill in the art that other modifications based on the technical ideas of the disclosure are feasible. Also, the embodiments of the disclosure may be combined with each other as required. For example, portions of the methods provided by the disclosure may be combined with each other to enable the BS and the UE to operate. Also, although the embodiments of the disclosure are described based on 5G and NR systems, modifications based on the technical scope of the embodiments of the disclosure may be applied to other communication systems such as LTE, LTE-Advanced (LTE-A), LTE-A-Pro systems, or the like.

Specific embodiments of the disclosure have been described in the descriptions of the disclosure, but it will be understood that various modifications can be made without departing the scope of the disclosure. Thus, it will be apparent to one of ordinary skill in the art that the scope of the disclosure is not limited to the embodiments described herein and should be defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method, performed by a base station in a wireless communication system, the method comprising:
transmitting, to an access and mobility management function (AMF) entity, network slice selection assistant information (NSSAI) requested by a terminal, the NSSAI including one or more single-NSSAIs (S-NSSAIs), wherein the one or more S-NSSAIs include at least one S-NSSAI not available in at least one first cell which is associated with a location of the terminal and covers a first frequency band;
receiving, from the AMF entity, a radio access technology/frequency selection priority (RFSP) index associated with the at least one S-NSSAI; and
in response to the reception of the RFSP index, transmitting, to the terminal, information associated with redirection of the terminal to at least one second cell which covers a second frequency band and supports the at least one S-NSSAI.

2. The method of claim 1, wherein each of the one or more S-NSSAIs corresponds to a different frequency band, and
wherein the RFSP index is retrieved by the AMF entity from a policy control function (PCF) entity.

3. The method of claim 1, wherein the at least one S-NSSAI is allowed in case that the terminal requests the at least one S-NSSAI after the redirection is performed.

4. The method of claim 3, wherein the at least one S-NSSAI is requested via a registration request message.

5. The method of claim 1, wherein cell reselection is performed by the terminal, based on the information associated with the redirection of the terminal.

6. The method of claim 1, further comprising redirecting the terminal to the at least one second cell, based on the RFSP index.

7. The method of claim 1, wherein a coverage of the at least one second cell overlaps with a coverage of the at least one first cell.

8. A method, performed by an access and mobility management function (AMF) entity in a wireless communication system, the method comprising:
receiving, from a base station, network slice selection assistance information (NSSAI) requested by a terminal, the NSSAI including one or more single-NSSAIs (S-NSSAIs),
wherein the one or more S-NSSAIs include at least one S-NSSAI not available in at least one first cell which is associated with a location of the terminal and covers a first frequency band; and
transmitting to the base station, a radio access technology/frequency selection priority (RFSP) index associated with the at least one S-NSSAI,
wherein in response to the transmission of the RFSP index, the terminal is redirected to at least one second cell which covers a second frequency band and supports the at least one S-NSSAI.

9. The method of claim 8, further comprising
retrieving the RFSP index from a policy control function (PCF) entity, wherein each of the one or more S-NSSAIs corresponds to a different frequency band.

10. The method of claim 8, further allowing the at least one S-NSSAI in case that the terminal requests the at least one S-NSSAI after the redirection is performed.

11. A base station in a wireless communication system, the base station comprising:
a transceiver; and
at least one processor coupled the transceiver and configured to:
transmit, to an access and mobility management function (AMF) entity via the transceiver, network slice selection assistance information (NSSAI) requested by a terminal, the NSSAI including one or more single-NSSAIs (S-NSSAIs),
wherein the one or more S-NSSAIs include at least one S-NSSAI not available in at least one first cell which is associated with a location of the terminal and covers a first frequency band;
receive, from the AMF entity via the transceiver, a radio access technology/frequency selection priority (RFSP) index associated with the at least one S-NSSAI; and
in response to reception of the RFSP index, transmit, to the terminal via the transceiver, information associated with redirection of the terminal to at least one second cell which covers a second frequency band and supports the at least one S-NSSAI.

12. The base station of claim 11, wherein the RFSP index is retrieved by the AMF entity from a policy control function (PCF) entity, and
wherein each of the one or more S-NSSAIs corresponds to a different frequency band.

13. The base station of claim 11, wherein the at least one S-NSSAI is allowed in case that the terminal requests the at least one S-NSSAI after the redirection is performed.

14. The base station of claim 11, wherein cell reselection is performed by the terminal, based on the information associated with the redirection of the terminal.

15. The base station of claim 11, wherein the at least one processor is further configured to redirect the terminal to the at least one second cell, based on the RFSP index.

16. The base station of claim 15, wherein the at least one S-NSSAI is requested via a registration request message.

17. The base station of claim 15, wherein a coverage of the at least one second cell overlaps with a coverage of the at least one first cell.

18. An access and mobility management function (AMF) in a wireless communication system, the AMF comprising:
a transceiver; and
at least one processor coupled to the transceiver and configured to:
receive, from a base station via the transceiver, network slice assistance information (NSSAI) requested by a terminal, the NSSAI including one or more single-NSSAIs (S-NSSAIs),
wherein the one or more S-NSSAIs include at least one S-NSSAI not available in at least one first cell which is associated with a location of the terminal and covers a first frequency band; and
transmit, to the base station via the transceiver, a radio access technology/frequency selection priority (RFSP) index associated with the at least one S-NSSAI,
wherein in response to transmission of the RFSP index, the terminal is redirected to at least one second cell which covers a second frequency band and supports the at least one S-NSSAI.

19. The AMF of claim 18, wherein the at least one processor is further configured to retrieve, via the transceiver, the RFSP index from a policy control function (PCF) entity, and
wherein each of the one or more S-NSSAIs corresponds to a different frequency band.

20. The AMF of claim 18, wherein the at least one processor is further configured to
allow the at least one S-NSSAI in case that the terminal requests the at least one S-NSSAI after the redirection is performed.

* * * * *